United States Patent [19]
Keller et al.

[11] Patent Number: 5,767,852
[45] Date of Patent: Jun. 16, 1998

[54] PRIORITY SELECTION ON A GRAPHICAL INTERFACE

[75] Inventors: Neal Martin Keller, Hartsdale, N.Y.; James Gordon McLean, Fuquay-Varina, N.C.; Clifford Alan Pickover, Yorktown Heights, N.Y.

[73] Assignee: International Business Machines Corporation, Armonk, N.Y.

[21] Appl. No.: 660,988

[22] Filed: Jun. 12, 1996

[51] Int. Cl.⁶ .................................................. G06F 3/00
[52] U.S. Cl. .................... 345/348; 395/673; 395/967; 395/966
[58] Field of Search ........................ 395/672, 673, 395/348, 349, 335, 351, 965, 974

[56] References Cited

U.S. PATENT DOCUMENTS

| | | | |
|---|---|---|---|
| 5,310,349 | 5/1994 | Daniels et al. | 434/350 |
| 5,564,004 | 10/1996 | Grossman et al. | 395/348 |
| 5,623,592 | 4/1997 | Carlson et al. | 395/348 |

Primary Examiner—Raymond J. Bayerl
Assistant Examiner—A. Katbab
Attorney, Agent, or Firm—Louis J. Percello

[57] ABSTRACT

Using a graphical user interface (GUI), users manipulate, organize, classify, and/or arrange icons by having the icons be consolidated in priority-control icons (PCI) containing regions. Regions may be on icons, windows, or other graphical objects. For example, when an icon representing a process is dragged close to a region on a PCI, the priority of that process is changed. The priority value depends upon to which region on the PCI a process is dragged.

25 Claims, 5 Drawing Sheets

PRIORITY SELECTION ON A GRAPHICAL INTERFACE

FIELD OF THE INVENTION

This invention relates to computer graphical user interfaces. More specifically, the invention relates to a graphical user interface (GUI) allowing users to conveniently specify and alter the scheduling priority of one or more running processes represented by icons displayed on a computer screen.

BACKGROUND OF THE INVENTION

Graphical user interfaces (GUIs) provide ways for users of computers and other devices to effectively communicate with the computer. In GUIs, available applications and data sets are often represented by icons consisting of small graphical representations which can be selected by a user and moved on the screen. The selection of icons often takes the place of typing in a command using a keyboard in order to initiate a program. In general, icons are tiny on-screen symbols that simplify access to a program, command, or data file. Icons are usually activated or selected by moving a mouse-controlled cursor onto the icon and pressing a mouse button.

GUIs include graphical images on computer monitors and often consist of both icons and windows. (GUIs may also reside on the screens of televisions, kiosks, and automatic teller machines (ATMs).) A computer window is a portion of the graphical image that appears on the monitor and is dedicated to some specific purpose. Windows allow the user to treat the graphical images on the computer monitor like a desktop where various files can remain open simultaneously. The user can control the size, shape, and position of the windows.

Although the use of GUIs with icons usually simplifies a user's interactions with a computer, GUIs are often tedious and frustrating to use. Icons must be maintained in a logical manner. It is difficult to organize windows and icons when many are similarly displayed at the same time on a single device.

In a drag-and-drop GUI, icons are selected and moved to a target icon to achieve a desired effect. For example, an icon representing a computer file stored on disk may be dragged over an icon containing an image of a printer in order to print the file, or dragged over an icon of a trash can to delete the file. A typical user's screen contains many icons, and only a subset of them will at any one time be valid, useful targets for a selected icon. For example, it would not be useful to drag the icon representing a data file on top of an icon whose only purpose is to access an unrelated multimedia application.

Users of computers and other systems sometimes desire to control the relative speeds of various processes in a multi-process environment by having the operating system spend more time performing computations associated with some processes and less time on others. (A process is a task constituting a unit of work for a computer, such as a program.) For example, long-running processes (such as a numerically intensive scientific computations) are sometimes given low priorities so that other immediate processes (e.g. messages and text editors) are not significantly slowed when all processes are sharing a finite computing resource. In multiuser systems, some users have higher priorities than others for various reasons. This means that these "privileged" users will have their processes run more quickly than other users.

Operating systems often contain commands that allow users to alter the priority of processes. However, these commands are not intuitive to users and give no graphical indication of process priority. For example, in the AIX and related UNIX operating systems, the "renice" command alters the scheduling priority of one or more running processes. With the renice command, the processes to be affected are specified by their process IDs (numerical identifiers associated with each running process). In the AIX operating system, if a user does not have root user authority, the user can only reset the priority of processes he or she owns and can only increase his or her "nice value" (decrease the scheduling priority) within the range of values from 0 to 20. If a user has root user authority, he or she can alter the priority of any process and set the priority to any value in the range −20 to 20, with 20 being the lowest priority. See the on-line AIX operating system manual page, herein incorporated by reference, specifically the output of the AIX "man" command. (The "man" command in AIX displays manual entries online.)

PROBLEMS WITH THE PRIOR ART

The problem with AIX and other prior-art operating-system controls of priority is that they do not supply a convenient graphical means for controlling process priority or for organizing and managing process priority for various tasks. For example, the prior art does not allow users to visually consolidate, control, and organize processes in different priorities categories on a user's screen.

OBJECTS OF THE INVENTION

An objective of this invention is an improved system and method for altering process priority and using graphical displays on graphical interfaces.

Another objective of this invention is an improved system and method for organizing, displaying, managing, and selecting icons and/or windows on a computer graphical interface.

SUMMARY OF THE INVENTION

This invention improves upon typical alphanumeric commands which are entered at the keyboard and allows users to alter the priority of processes in a graphical manner useful in drag-and-drop environments. In particular, a graphical user interface is described that conveniently allows priority and process scheduling to be controlled. Such an interface could be used in three-dimensional (e.g. virtual reality) environments in addition to standard two-dimensional GUI presentations.

This invention permits users to conveniently alter the scheduling priority of one or more running processes represented by GUI icons and windows, particularly in a drag-and-drop interface but also in any presentation where changing scheduling priority is desired. In a preferred embodiment, as a result of selecting and dragging an icon/window to a "priority-controller" icon or region of the screen, the priority of the dragged icon/window is specified. The priority-controller icon contains different regions that may be visually distinguished, and each region represents a different processes priority. In other words, when a user drags an icon representing a task to a region of the priority-controller icon, the priority of the task is changed to the priority associated with that "region" of the priority-controller. For example, the priority-controller icon may be represented by a rectangular strip. One end may be dark blue representing very low priority, such as would be given to a suspended (i.e. non-running) processes. The other end may be red indicating high priority. A continuum of colors (e.g. blue, green, yellow, orange, and red) may be used to give the users a visual indication of priority. Alphanumeric designators positioned on the icon may also give priority information. The regions may simply be locations on a strip, or cutouts into which the icon is placed. The priority-controller icon thus creates an interactive visual index for the user, and/or guides the user to specific regions of the priority-controller in a drag-and-drop interface. If desired, the new priority of the process represented by the dragged icon may be reflected in the color of the dragged icon. Icon colors may also be controlled by the operating system and may change when the operating system changes the priority of processes represented by icons. The priority of the processes can again be altered by dragging the icon representing a process to another region of the priority-controller icon.

DETAILED DESCRIPTION OF THE INVENTION

Figure 1:
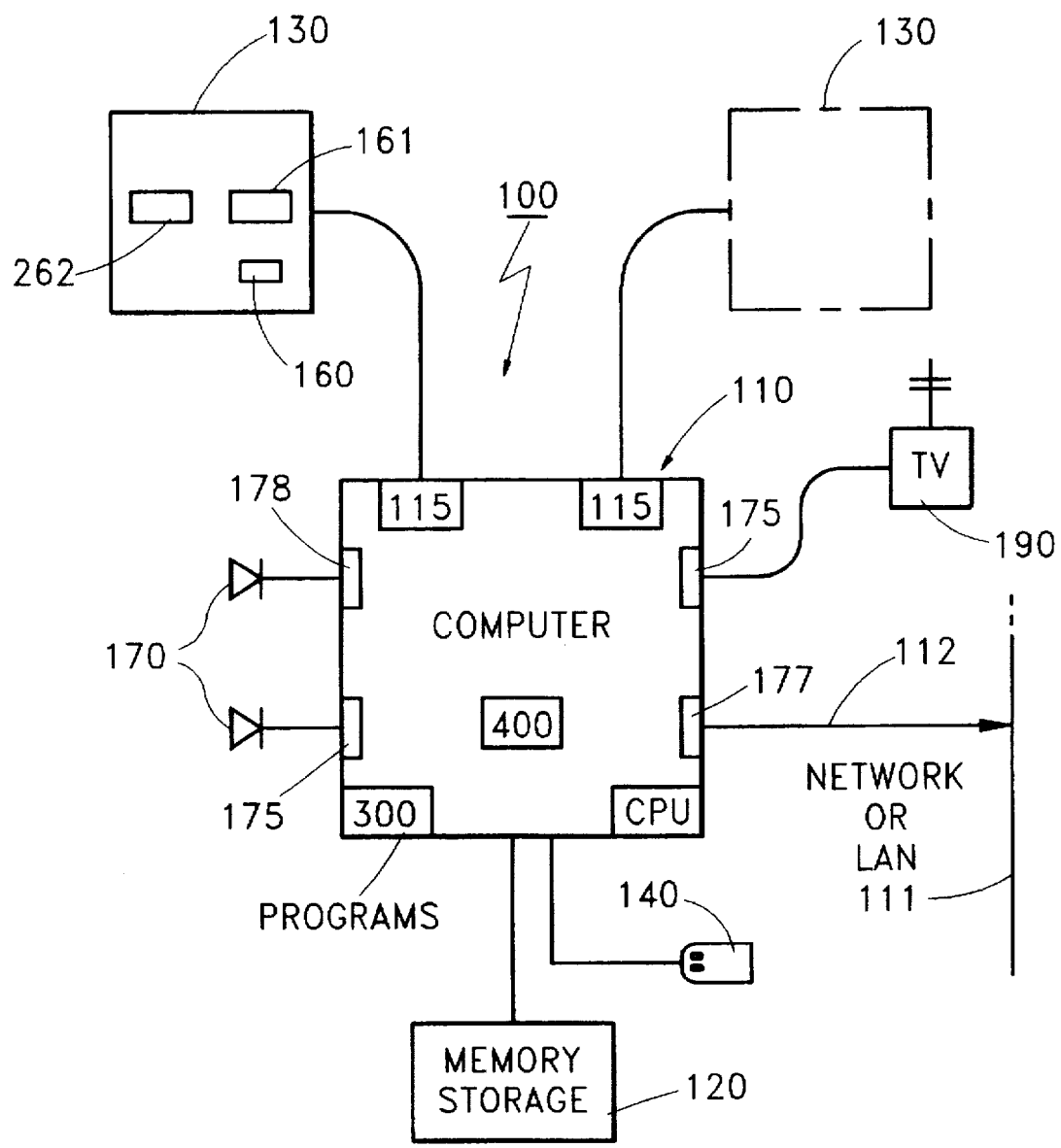
FIG. 1 is a block diagram of the hardware and one preferred embodiment of the present invention.

This invention permits users to control the priority of processes represented by graphical objects, e.g., icons and windows, using priority-controller icons or regions of the computer screen. A priority-controller region is a location on a graphical object (or computer screen) to which other graphical objects on a GUI are moved. These graphical objects can be represented on the GUI by one or more GUI objects 161 that include: icons 161 with static or animated graphics, text, multimedia presentations, and windows displaying TV broadcasts. GUI objects 161 could also include three dimensional images, for example, those used in virtual reality applications. In a preferred embodiment, an icon may be dragged to a priority-controller icon so that the process represented by the icon is altered by its position relative to the priority-controller icon.

The present invention is capable of running on any general purpose computer system or computer controlled GUI (e.g. a television or virtual reality system), including GUIs that have the ability to present multimedia and/or virtual reality information. One preferred embodiment is represented in a block diagram in FIG. 1. A computer system 100 comprises a central processing unit (CPU) 110, memory storage device 120, one or more monitors or graphical interfaces 130, and selection device 140 such as a mouse or speech recognition system 178. In one embodiment, a IBM RISC SYSTEM/6000 100 comprises a central processing unit (CPU) 110, memory storage device 120, one or more monitors 130, and a mouse 140. The mouse 140 may be used to select GUI objects 161, like icons 161. On an IBM RISC System/6000, multiple monitors 130 can be controlled by multiple monitor adaptor cards 115 such as the IBM RISC System/6000 Color Graphics Display Adaptor. The computer system 100 may also have audio input/output capability 170. An ActionMedia II Display Adapter 175 (described in the IBM ActionMedia II Technical Reference) can be used for audio/video playback 170.

This adaptor 175 may also be used to display TV broadcasts/signals 190, e.g. "picture-in-picture" of TV broadcasts, and other full motion video and sound audio/visual on the monitors 130.

In addition, speech synthesis or speech recognition 178 may be provided. Speech recognition may take place using a IBM VoiceType Dictation Adapter.

In an alternative embodiment, the CPU 110 can be connected 112 via a network adaptor 177 to connect the system 100 to the network 111. Network adaptors 177 are well known. Three examples 177 include token ring adaptors, ethernet adaptors, and modems. The system 100 can be connected to other target monitors 130 through a client/server network (or LAN 111).

Systems that can be used to display graphical images, like icons and windows, are well known.

GUIs can be used to control any apparatus having a monitor. In the field of television (TV), channel selection can be performed by selecting an icon consisting of the animated video broadcast on a given channel frequency.

Figure 2:
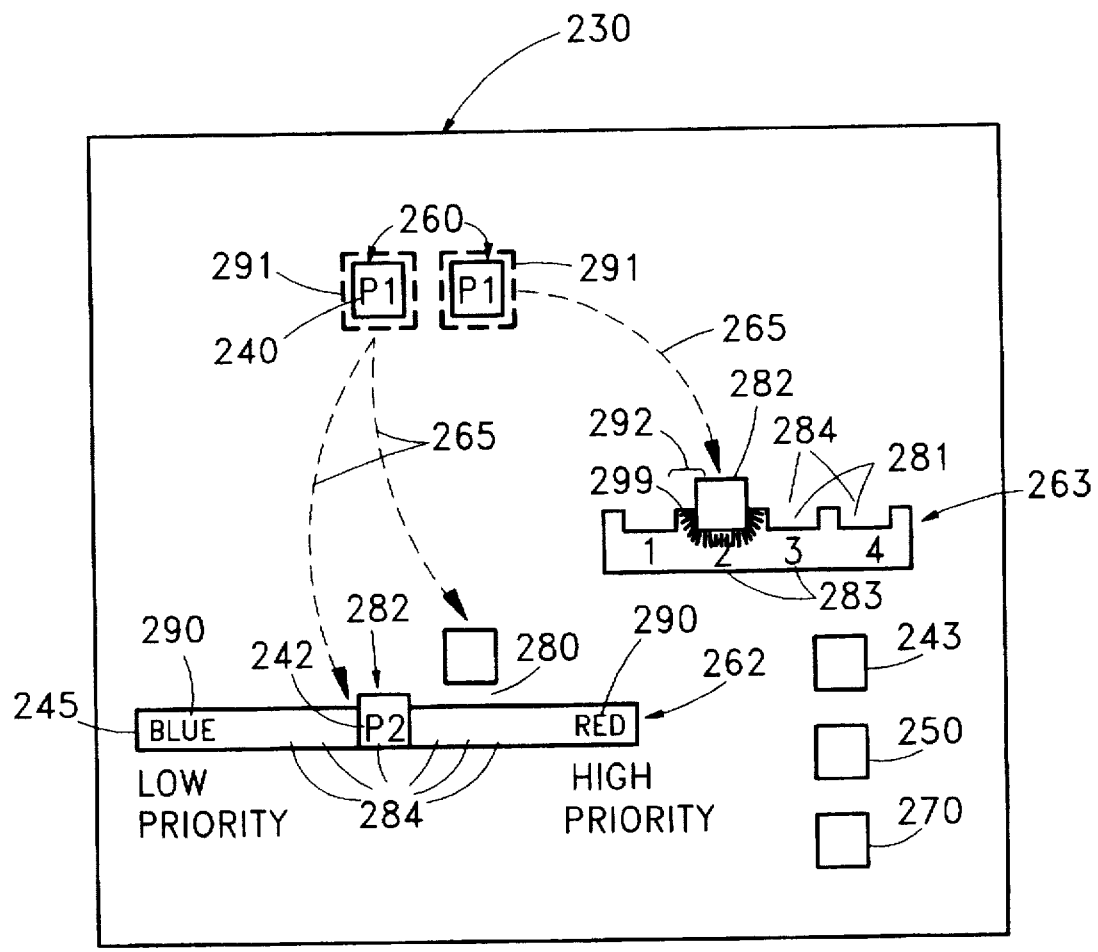
FIG. 2 is a drawing of a monitor with graphical images/selectable items on its graphical interface.

FIG. 2 is a block diagram of a GUI 230 with icons 161 (see FIG. 1) including priority-controller icons (PCIs) 262, 263 and icons 260 representing processes, applications, or programs 270 (300 in FIG. 1). As an example, in AIX operating systems priority values take on values from −20 (high priority) to 20 (low priority). Processes with lower priority values run more quickly than processes with high values. In the present invention, the user uses a selection device (mouse) 140 to select 291 an icon 260 and drags 265 the icon to a priority controller icon, 262 or 263. If the icon 260, representing a process, is touching or close (within a threshold distance 280) to the process-controller icon 262, then the priority of the process is changed from its initial value P1 240 to a new value P2 242. In other words, "closeness" of an icon is determined by computing the distances from the selected icon 260 to regions 284 of PCIs 262, 263 displayed on the GUI. If the distance is smaller than a particular threshold 280, the icon 260 is close to a region of the PCI.

In one embodiment, the process-control icons (PCIs) 262 or 263 consists of different regions 284 to which process icons 260 are dragged. The process-control manager software (PCM) 250 determines near what location 282 icon 260 is positioned using techniques which are well known to those skilled in the art of GUI interfaces. The new priority P2 242 is determined by the position 282 of icon 260 with respect to the PCI 262 or 263. For example, if icon 260 is at one end 245 of the PCI 262, the process represented by icon 242 may be assigned a low priority P2 242. If icon 242 is positioned at the other end 246, the process represented by icon 242 is assigned a high priority. Intermediate regions 284 may correspond to intermediate values of priority. The specific mapping of positions to priority values P2 242 can be carried out by the PCM 250 by comparing the position 282 of icon 260 to values stored in a priority file 243 which may be stored on disk. (File 243 is described in the description of FIG. 5.)

The PCI 263 may also contain graphical indications of regions 284, such as cutouts 281, to which icons 260 may be dragged. In this manner, when the icons are placed in the PCI 263 there can be a graphical indication 292 of the binding to the user. Additionally, the area around the cutout may change color or brightness 299 once an icon 260 is located in the cutout. The use of discrete cutouts 281 may be useful when only a few discrete priority values may be used, or if no two processes are to have priority values that are the same or close to one another. The priority values may be evident to the user by text 283 written on the PCI or by colors 290.

Figure 3:
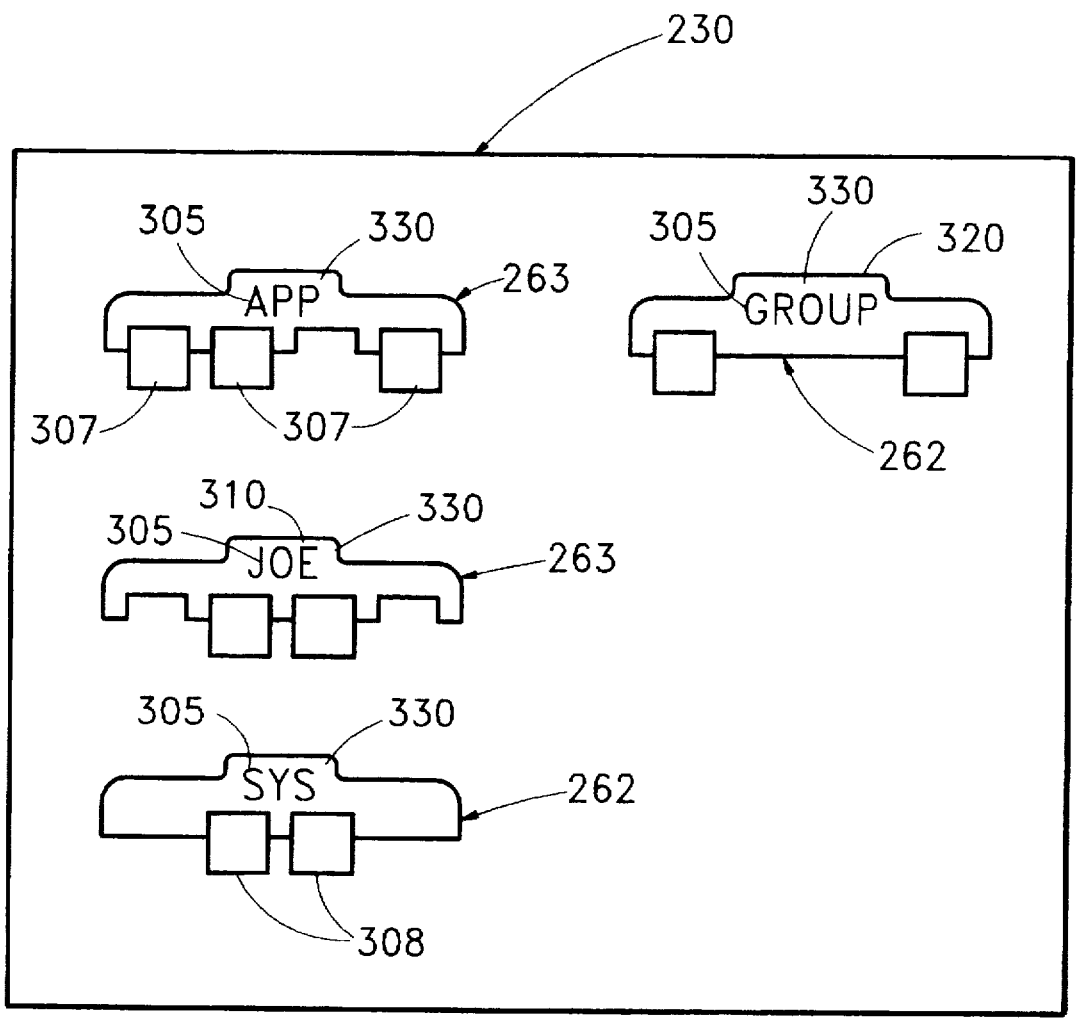
FIG. 3 is a drawing of a monitor with various configurations of graphical images/selectable items on its graphical interface.

FIG. 3 shows an arrangement of multiple PCIs 262, 263 on a GUI 230. Users may have different classes 305 of applications which may be visually managed, consolidated, or organized by using PCIs for the different classes. For example, one PCI may be used to prioritize user application programs represented by icons 307. Another PCI may be used for system programs represented by icons 308. System administrators may find PCIs useful for visually controlling and organizing processes of different users 310 or groups 320. For example, the PCIs 262,263 can be depicted as shelves with each shelf organizing icons of a particular class and/or priority of execution. In virtual reality systems, the PCIs 262, 263 can be three dimensional shelves, or variations like compartments or cabinets. Virtual reality systems are well known, for example, see U.S. Pat. No. 5,310,349 to Daniels et al. issued on May 10, 1994 which is herein incorporated by reference in its entirety.

Text 330 may appear on the PCIs to give users additional feedback as to the class of applications represented by a particular PCI. When used to control processes running on remote systems, such as server computers on the World-Wide Web, a graphical consolidation of processes, as shown in FIG. 3, may be especially useful. For example, users who pay more money to an Internet service provider for "premium" web service may have greater priorities when running server programs or getting network access than those users who pay less.

Figure 4:
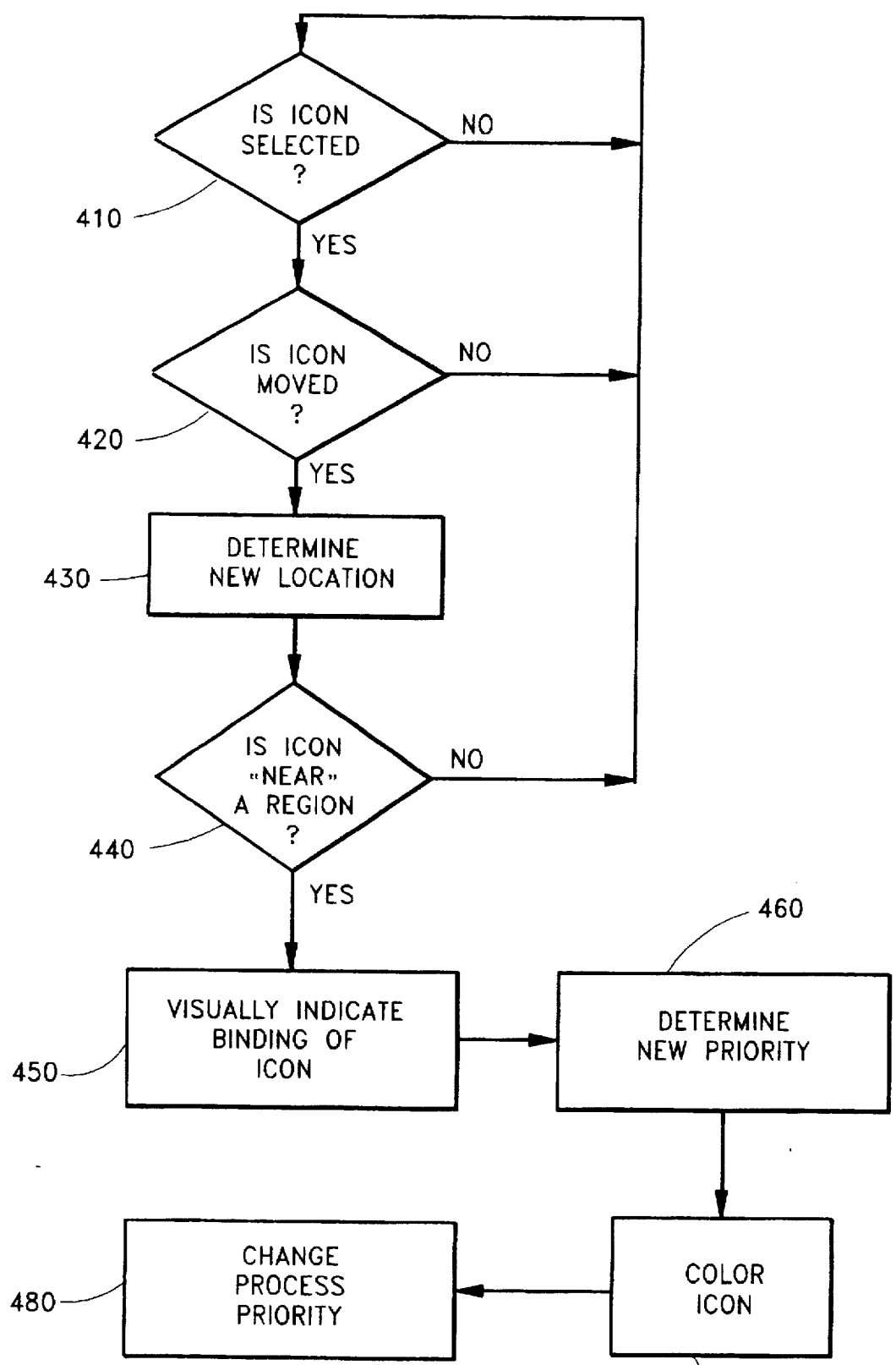
FIG. 4 is a flow chart showing the steps of one preferred method of the present invention.

FIG. 4 is a flow chart showing the steps 400 performed for a preferred version of priority changing with PCIs 262, 263 executed by system 100. In step 410, a program checks if an icon 260 is selected. The selected icon 260 may be selected by any selection method: e.g., pointing and clicking or by an application program. If the icon is moved 420, its new location is determined 430. If the icon is near (within a threshold distance 280 from) a PCI region 284 (step 440), then a visual indication 450 of placement such as changing color or brightness 299 of a region 284 optionally may be given. As stated in the description for FIG. 2, the regions 284 may be graphically depicted as cutouts to help give users a graphical (visual) indication of the placement. As mentioned in the description for FIG. 2, "nearness" or "closeness" is determined 440 by computing the distances from the selected icon to all PCI regions 284 on the GUI. In one preferred embodiment, distances are computed using known geometrical methods. For example, if (x1,y1) are the coordinates of an icon 260 and (x2,y2) are the coordinates of a region 284, then the distance is d=sqrt ((x2−x1)2+(y2−y1)2). This formula may be extended to include additional variables for higher dimensional spaces, such as in a virtual reality or three-dimensional environment. A PCI table 500 on disk may store the locations of regions 284 and also their associated priority values as described in the description of FIG. 5.

The new priority 242 of a process represented by an icon 260 is determined 460 when process control monitor (PCM) software 250 examines data structure 500 which associates icon location (see step 430) and a priority value 242. The icon 260 optionally may change color, brightness, texture, blink rate, shape, size, or other graphical attribute (see step 470). This graphical attribute may be a function of the priority value 242. For example, an icon representing a task with high priority may be red. An icon representing a task with low priority may be green. Finally, the PCM changes 480 the priority of the process associated with icon 260 to that of the region 284. Changing priorities is accomplished by standard operating system methods, such as the "renice" command in AIX and UNIX operating systems. The PCM 250 may issue, for example, a renice command once an icon 260 is placed near region 284.

Figure 5:
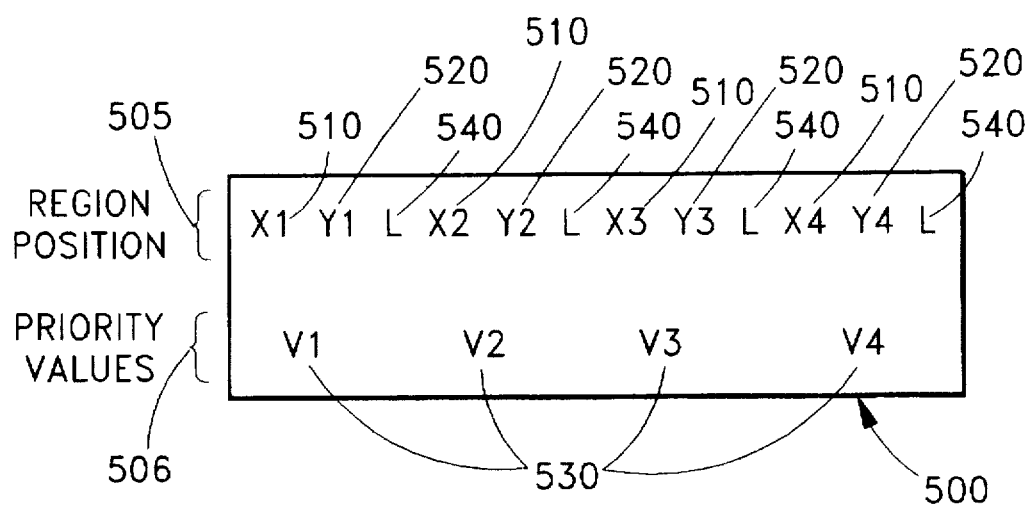
FIG. 5 is a block diagram of a data structure that defines the priority values associated with different regions of the priority controller icon.

FIG. 5 is a block diagram of one typical preferred data structure (table) 500 that is used to contain the positions of PCI regions 284 and their associated priority values. For example, the first row 505 may contain the (x 510 y 520) coordinates specifying the spatial location of regions 284. In a three-dimensional GUI, z coordinates may be added. In the example block diagram in FIG. 5, line 1 (first row 505) contains four (x,y) pairs which may specify the locations of four different regions. Additional coordinates may be used in three-dimensional or virtual reality environments. For example, the first record can be expanded to "x y z, x y z, x y z, x y z" to specify four three-dimensional locations of regions. The second row (506) lists priority values (530) v1, v2, v3, v4 associated with the position of each icon region in the first record. These values are used to specify the priority (P2, 280 in FIG. 2) of a process associated with an icon 260. Note that this data structure can also be used with a PCI 262 that appears to have a continuous range of priority values by including many values for coordinates and priority values in rows one 505 and two 506 of the data structure. It is also possible to have the PCM 250 interpolate between priority values 530 when an icon's position coordinates are between PCI coordinates 510, 520.

There are many applications for PCIs. For example, they may be used to visually consolidate icons in different categories on a user's screen (e.g., icons representing system programs, user programs, and graphics programs may be separately organized.) They can be used to conveniently change priorities of processes represented by icons or even to suspend processes (i.e. give them no priority). They are more conveniently used than typical operating system commands which sometimes require users to know both process-ID numbers and ranges of meaningful priority values (see appended information on the AIX "renice" command). Such priority values are often not easy to remember, nor do they make much sense to users. PCIs are not only used to specify priorities, but they also give users a continuous visual "index" of the priorities of various processes. This is not feature of typical alphanumeric commands used to enter priority values.

The PCM may move icons along (or within) a PCI based on system load. For example, a user may place an icon at a high priority region on a PCI (e.g. PCI 262) and other icons already on the PCI may slide by moving on the display to lower priority. This may be useful for managing priorities with finite computational resources. Some icons on the PCI may be locked so that they do not move in response to placement of other icons on the PCI, while others may be mobile. The locking of icons can be controlled in a file, such as the one shown in FIG. 5. This may be accomplished, for example, by adding a value L 540 to the row 505 in the data structure 500 that contains position coordinates 510, 520. A value of 1 for L can signify that an icon at location 510,520 is not to be moved in response to placement of icons on the PCI. A value of 0 for L can signify that the icon at this location may be moved in response to placement of icons on the PCI The lock value L 540 can also be used to signify that users can not move a particular icon from the PCI without special privileges. This can be useful, for example, by system administrators who allow ordinary or beginning users to see a process in the PCI but who do not wish ordinary users to be able to alter the process priority.

The PCI regions in the present invention need not consist of a visually distinguished regions on an icon. Such regions may also be visible or invisible spatially-distinguished regions of the computer screen to which icons are dragged to control the priority of the processes they represent. For example, the act of dragging an icon to the "upper right" portion of the computer screen may constitute a priority specification for the process represented by the dragged icons. Upper right may designate high priority tasks. Lower left can designate low priority tasks. The dragging and selecting of the icons may be done by the user or (automatically) by the computer system. In order to make use of these spatially-distinguished regions of the computer screen (i.e. GUI), as mentioned in the description for FIG. 4, "nearness" or "closeness" is determined 440 by computing the distances from the selected icon to all regions on the GUI. In this example, the regions (e.g. 284 in FIG. 2) are not part of an icon but are part of the GUI and may be invisible, or differentiated by color, outline, brightness or other graphical feature. The region positions and associated priority values can be stored in a data structure (table) 500 as show in FIG. 5. These regions may be displayed in a separate window on the computer screen so as not to affect the layout of graphical objects (e.g. icons) on the user's desktop. This separate window may contain various icons copies of which are also on the primary window.

As discussed, this invention may have particular value in the management of Internet server computers that run various programs at the request of remote users. The invention is useful for any system with multiple users and processes. Individual users may control their own processes. System administrators may control processes of many different users.

In a three-dimensional (e.g. virtual reality) GUI, users might "grab" a 3-D object representing a processes and move it into a 3-D PCI. As an example, a graphical depiction of a molecule may represent a molecular dynamics simulation. When the molecule is placed on a particular shelf in a virtual room, the simulation's priority is altered. In this case, the shelf is a region of the PCI. The lock value 540 may control whether an object representing a process can be removed from the shelf to change the priority of the process. As another virtual reality example, users may be represented as 3-D graphical representations of human bodies. When these bodies are placed on a particular shelf, the priorities of all processes of the corresponding users are specified or altered.

The PCI may be used in an operating system to alter the priority of tasks controlled by the operating system. The PCI may be used in a multi-media environment to alter the update-priority of various video windows or other multimedia objects. The PCI may be used for network control and with network control software to alter the access priority of various network users. The PCI may be used by videoconferencing/teleconferencing users to alter the priority of various audio-visuals. For example, a videoconference via computer may consist of several windows showing text presentations, animations of people in the room, sound, and "chat" text windows—the priority of which can be controlled by the PCI. The PCI may be used to allocate network bandwidth, allocate various resources by Internet service providers, and allocate modem speeds in a multimodem environment. The PCI may be used to prioritize resources for various information-search services. For example, a financial service may use this to control the frequency of stock information updates and notifications, and search frequency, depth, and access to resources such as provided by different databases. The service provider may use this to improve the priority of service for customers who pay more money, or the customers themselves can increase the priority of information services using these methods if the users are willing to pay more money.

This invention also is naturally be extended to other related operating system commands. For example, the access to particular files may be changed by moving an icon representing a file to an access-controller icon. The act of placing the icon would take the place of the "chmod" command in UNIX. The chmod command modifies the read, write, and execute permissions of specified files and modifies the search permission codes of specified directories. These permissions are usually defined using alphanumeric symbols in a hard-to-remember sequence. To modify the present invention to control file access, step 460 in FIG. 4 would be "determine new access values", and step 480 would be "change access." The priority values 530 would, in this example, represent file-access values instead of task-priority values. As an example, UNIX allows access based on "users", "groups", and "others." Each of these can be represented by an access-controller icon. For example, as a result of moving an icon representing a file to the "group" access-controller, the file is made accessible to the group.

The ideas in this invention apply to various arenas in which graphical resource specification and allocation is important. In various control centers, touch screens may be useful to move graphical objects to the PCIs.

Given this disclosure alternative equivalent embodiments would become apparent to one skilled in the art. These embodiments are also within the contemplation of the inventors.

We claim:

1. An priority-controller icon displayed on a graphical user interface of a computer system, the icon comprising:
   one or more locations, each location associated with a priority of execution and a first location being one of the locations;
   a threshold distance for each of the locations, where an icon, representing a process, is placed on the graphical user interface within the threshold distance of the first location causing the process represented by the icon to be assigned the priority of execution of the first location.

2. A priority-controller icon, as in claim 1, where the locations also have a color that is associated with the respective priority of execution.

3. A priority-controller icon, as in claim 1, where the threshold distance is zero, so that the icon is dropped on the priority-controller icon first location.

4. A priority-controller icon, as in claim 1, where the icon changes an attribute when the process is assigned the priority of execution of the first location.

5. A priority-controller icon, as in claim 4, where the attribute includes any one of the following: color, brightness, texture, blink rate, shape, or size.

6. A priority-controller icon, as in claim 1, where the locations are a continuous visual index.

7. A priority-controller icon, as in claim 6, where the priority of execution at one or more of the locations on the continuous visual index are interpolated.

8. A priority-controller icon, as in claim 1, where one or more of the locations is a distinguished region of the graphical user interface.

9. A priority-controller icon, as in claim 8, where the distinguished region is visually distinguished.

10. A priority-controller icon, as in claim 9, where the distinguished region is visually distinguished by any of the following: color, outline, texture, or brightness.

11. A priority-controller icon, as in claim 8, where the distinguished region is spatially distinguished.

12. A priority-controller icon, as in claim 1, where one or more of the locations is a cutout on the priority-controller icon.

13. A priority-controller icon, as in claim 12, where there is a visual indication of binding when the icon is within the threshold distance.

14. A priority-controller icon, as in claim 1, that has a textual description display on the priority-controller icon.

15. A priority-controller icon, as in claim 1, that is three dimensional.

16. A priority-controller icon, as in claim 15, that is used in a virtual reality graphical user interface.

17. A priority-controller icon, as in claim 1, that is used to organize one or more icons by one or more icon classes.

18. A priority-controller icon, as in claim 17, that has any one of the following depictions: shelf, cabinet, compartment, and container.

19. A computer system with a computer memory and a central processing unit, comprising:
   a graphical user interface;
   one or more priority-controller icons displayed on the graphical user interface, each of the priority-controller icons having one or more locations, each location associated with a priority of execution, and a first location being one of the locations;
   a threshold distance for each of the locations, where an icon, representing a process, is placed on the graphical user interface within the threshold distance of the first location causing the process represented by the icon to be assigned the priority of execution of the first location.

20. A system, as in claim 19, where one or more of the priority-controller icons is associated with a class of one or more processes and only can change the priority of execution on the processes in the class.

21. A system, as in claim 19, where the computer is a server on a network of computers.

22. A system, as in claim 21, where the server uses one or more priority-controller icons to alter the access priority of one or more network users.

23. A system, as in claim 19, where one or more of the priority-controller icons is used to alter the priority of one or more tasks controlled by an operating system of the computer.

24. A method of assigning an execution priority to a process running on a computer system comprising the steps of:
   a. selecting an icon that represents the process on a graphical user interface;
   b. moving the icon to within a threshold distance of first location being one of one or more locations on a priority-controller icon;
   c. assigning the process represented by the icon an execution priority the is associated with the first location.

25. An priority-controller icon displayed on a graphical user interface of a computer system, the icon comprising:
   one or more locations means for designating a priority of execution and a first location means being one of the location means;
   a threshold distance means, for each of the location means, for determining if an icon means, representing a process, is placed on the graphical user interface within the threshold distance means of the first location means so that the process represented by the icon means is assigned the priority of execution of the first location means.

* * * * *